(12) United States Patent
Switzer et al.

(10) Patent No.: US 9,976,414 B2
(45) Date of Patent: May 22, 2018

(54) DOWNHOLE PROBE ASSEMBLY WITH BLUETOOTH DEVICE

(71) Applicant: Evolution Engineering Inc., Calgary (CA)

(72) Inventors: David A. Switzer, Calgary (CA); Jili Liu, Calgary (CA); Patrick R. Derkacz, Calgary (CA); Aaron W. Logan, Calgary (CA)

(73) Assignee: Evolution Engineering Inc., Alberta, CA (US)

(*) Notice: Subject to any disclaimer, the term of this patent is extended or adjusted under 35 U.S.C. 154(b) by 103 days.

(21) Appl. No.: 14/912,156

(22) PCT Filed: Aug. 12, 2014

(86) PCT No.: PCT/CA2014/050768
§ 371 (c)(1),
(2) Date: Feb. 15, 2016

(87) PCT Pub. No.: WO2015/021550
PCT Pub. Date: Feb. 19, 2015

(65) Prior Publication Data
US 2016/0194952 A1    Jul. 7, 2016

Related U.S. Application Data

(60) Provisional application No. 61/865,511, filed on Aug. 13, 2013.

(51) Int. Cl.
*E21B 47/12* (2012.01)
*H04W 84/18* (2009.01)

(52) U.S. Cl.
CPC ........... *E21B 47/122* (2013.01); *H04W 84/18* (2013.01)

(58) Field of Classification Search
None
See application file for complete search history.

(56) References Cited

U.S. PATENT DOCUMENTS 4,373,582 A * 2/1983 Bednar ................. E21B 21/103
166/321
5,778,979 A * 7/1998 Burleson ............... E21B 43/116
166/297

(Continued)

FOREIGN PATENT DOCUMENTS

CA    2411083 A1    5/2003
CA    2791214 A1    5/2003

(Continued)

OTHER PUBLICATIONS

PCT International Search Report and Written Opinion from PCT Application No. PCT/CA2014/050768 entitled Downhole Probe Assembly With Bluetooth Device (dated Oct. 27, 2014).

(Continued)

*Primary Examiner* — Quan-Zhen Wang
*Assistant Examiner* — Chico A Foxx
(74) *Attorney, Agent, or Firm* — Hovey Williams LLP

(57) ABSTRACT

The embodiments described herein generally relate a downhole probe assembly incorporating a Bluetooth device for wirelessly transmitting electrical information between the downhole probe assembly and a surface electronic interface such as a computer when the probe assembly is above ground. The downhole probe assembly includes sensors for sensing downhole conditions; a controller in electrical communication with the sensors and configured to receive and process information from the sensors; a housing enclosing the one or more than one sensor and the controller; the Bluetooth device in electrical communication with the controller; and an end cap assembly fitted at one end of the housing. The end cap assembly partially surrounds the (Continued)

Bluetooth device and is configured for transmission of the electrical information therethrough. Also described is an end cap assembly for fitting to one end of a downhole probe assembly including a transmission module mated with and electrically connected to the Bluetooth device. The end cap assembly includes an end cap having an end cap mating section configured to mate with a mating section of the transmission module to form a chamber enclosing the Bluetooth device between the transmission module and the end cap. A known downhole probe assembly can be retrofitted with the Bluetooth device and end cap subassembly. The end cap subassembly is configured and adapted to promote signal transmission between the Bluetooth device and a surface computer or other electronic interface.

19 Claims, 9 Drawing Sheets

(56) References Cited

U.S. PATENT DOCUMENTS

| | | | | |
|---|---|---|---|---|
| 5,835,064 A * | 11/1998 | Gomez | ............... | H01Q 1/242 343/702 |
| 6,531,871 B1 * | 3/2003 | Hay | .............. | E21B 47/122 175/40 |
| 7,301,474 B2 | 11/2007 | Zimmerman | | |
| 8,164,980 B2 * | 4/2012 | Sullivan | ............... | E21B 17/028 340/854.3 |
| 8,378,840 B2 | 2/2013 | Khan et al. | | |
| 8,893,822 B2 * | 11/2014 | Trinh | ............... | E21B 10/00 175/24 |
| 9,024,776 B2 * | 5/2015 | Sugiyama | ............ | E21B 47/122 166/255.1 |
| 2003/0128195 A1 * | 7/2003 | Banerjee | ............ | G06F 3/03545 345/179 |
| 2005/0113131 A1 * | 5/2005 | Lin | ............... | G01K 1/024 455/550.1 |
| 2005/0145416 A1 | 7/2005 | Reed et al. | | |
| 2006/0146646 A1 * | 7/2006 | Fanini | ............... | G01V 11/002 367/27 |
| 2007/0023185 A1 * | 2/2007 | Hall | ............... | E21B 17/003 166/255.1 |
| 2007/0272442 A1 * | 11/2007 | Pastusek | ............... | E21B 21/08 175/40 |
| 2008/0068209 A1 * | 3/2008 | Sugiyama | ............ | E21B 47/122 340/853.2 |
| 2010/0097890 A1 * | 4/2010 | Sullivan | ............... | E21B 17/028 367/82 |
| 2010/0200295 A1 * | 8/2010 | Schimanski | ............ | E21B 47/122 175/45 |
| 2010/0213942 A1 * | 8/2010 | Lazarev | ............... | E21B 17/028 324/333 |
| 2010/0238977 A1 * | 9/2010 | Bulled | ............... | H04W 52/0229 375/136 |
| 2012/0285178 A1 * | 11/2012 | Pennewitz | ............ | E21B 36/001 62/3.1 |
| 2013/0206401 A1 * | 8/2013 | Bhoite | ............... | E21B 47/0905 166/255.1 |
| 2014/0060811 A1 * | 3/2014 | Mazyar | ............... | E21B 49/082 166/118 |
| 2014/0060820 A1 * | 3/2014 | Bittar | ............... | E21B 47/01 166/250.01 |
| 2014/0231142 A1 * | 8/2014 | Poitzsch | ............... | E21B 47/065 175/50 |
| 2014/0285204 A1 * | 9/2014 | Okonkwo | ............ | E21B 47/011 324/333 |
| 2014/0368350 A1 * | 12/2014 | Wang | ............... | G01V 3/00 340/854.4 |
| 2016/0061985 A1 * | 3/2016 | Okonkwo | ............ | E21B 47/011 324/333 |
| 2016/0115783 A1 * | 4/2016 | Zeng | ............... | E21B 47/122 340/854.4 |
| 2016/0115784 A1 * | 4/2016 | Littleford | ............ | E21B 33/068 166/250.03 |

FOREIGN PATENT DOCUMENTS

| | | |
|---|---|---|
| CA | 2676459 A1 | 6/2006 |
| CA | 2545738 A1 | 11/2006 |
| CA | 2683245 A1 | 4/2010 |
| CA | 2817862 A1 | 5/2012 |
| CA | 2818830 A2 | 5/2012 |
| CN | 2888068 Y | 4/2007 |
| CN | 101476462 | 7/2009 |
| CN | 201358711 Y | 12/2009 |
| CN | 203114281 U | 8/2013 |
| WO | 2006108000 A2 | 10/2006 |
| WO | 2008032194 A1 | 3/2008 |
| WO | 2011066624 A1 | 6/2011 |

OTHER PUBLICATIONS

International Preliminary Report on Patentability (IPRP) for PCT Application No. PCT/CA2014/050768 entitled Downhole Probe Assembly With Bluetooth Device(dated Nov. 9, 2015).

* cited by examiner

DOWNHOLE PROBE ASSEMBLY WITH BLUETOOTH DEVICE

CROSS REFERENCE OF RELATED APPLICATIONS

This is a National Phase Application pursuant to 35 U.S.C. § 371 of International Application No. PCT/CA2014/050768 filed Aug. 12, 2014, claiming priority of U.S. Provisional Application No. 61/865,511 filed Aug. 13, 2013, each of which is hereby incorporated in its entirety by reference herein.

FIELD

This invention relates generally to a downhole probe assembly for downhole drilling, such as measurement-while-drilling (MWD), incorporating a Bluetooth device for wirelessly transmitting electrical information between the downhole probe assembly and a surface electronic interface such as a computer.

BACKGROUND

The recovery of hydrocarbons from subterranean zones relies on the process of drilling wellbores. The process uses drilling equipment situated at surface with a drill string extending from the surface equipment to the formation or subterranean zone of interest. The drill string can extend thousands of feet or meters below the surface. The terminal end of the drill string includes a drill bit for drilling (or extending) the wellbore. In addition to this conventional drilling equipment, the system also relies on some sort of drilling fluid, in most cases a drilling "mud" which is pumped through the inside of the drill string, cools and lubricates the drill bit and then exits out of the drill bit and carries rock cuttings back to surface. The mud also helps control bottom hole pressure and prevent hydrocarbon influx from the formation into the wellbore which can potentially cause a blow out at surface.

Directional drilling is the process of steering a well away from vertical to intersect a target endpoint or follow a prescribed path. At the terminal end of the drill string is a bottom-hole-assembly ("BHA") which comprises 1) a drill bit; 2) a steerable downhole mud motor of rotary steerable system; 3) sensors of survey equipment (Logging While Drilling ("LWD") and/or Measurement-while-drilling ("MWD")) to evaluate downhole conditions as well depth progresses; 4) equipment for telemetry of data to surface; and 5) other control mechanisms such as stabilizers or heavy weight drill collars. The BHA is conveyed into the wellbore by a metallic tubular.

As an example of a potential drilling activity, MWD equipment is used to provide downhole sensor and status information to surface in a near real-time mode while drilling. This information is used by the operator to make decisions about controlling and steering the well to optimize the drilling speed and trajectory based on numerous factors, including lease boundaries, locations of existing wells, formation properties, and hydrocarbon size and location. This can include making intentional deviations from an originally planned wellbore path as necessary based on the information gathered from the downhole sensors during the drilling process. The ability to obtain real time data during MWD allows for a relatively more economical and more efficient drilling operation.

In both directional and straight (or vertical) holes, the position of the BHA must be known with reasonable accuracy to ensure the correct well trajectory. While extending the wellbore, evaluation of physical properties such as pressure, temperature and the wellbore trajectory in three-dimensional space is important. Other borehole parameters that may also be assessed include, but are not limited to, fluid flow rate, resistivity, and BHA bit data such as weight on bit, torque on bit, etc.

In most downhole operations, it is often necessary to insert or introduce gauges, sensors or testing instrumentation into the borehole in order to obtain information of borehole parameters and conditions. Such parameters might include, but are not limited to, temperature, pressure, directional parameters, and gamma radiation. The electrical componentry of the various sensors and gauges used to obtain the information is mounted on or near circuit boards which are contained within an apparatus. The circuit boards may be referred or positionally favoured to one side of the carrier apparatus. The gauges are typically protected as they are imbedded in the wall, and hence completely housed within the apparatus.

In downhole MWD, the MWD tool surveys the well as it is drilled and information regarding which way the motor is oriented is relayed back to the operator on surface. A typical Directional and Inclination (D&I) sensor package consists of a series of accelerometers and magnetometers which respectively measure the inclination of the tool (for example vertical is 0° inclination and horizontal is 90° inclination) and the earth's magnetic field to determine azimuth. Generally, all MWD tools contain essentially the same D&I sensor package to survey the well bore but the data may be sent back to surface by various telemetry methods. Such telemetry methods include, but are not limited to, the use of hardwired drill pipe, acoustic telemetry, fibre optic cable, Mud Pulse (MP) Telemetry and Electromagnetic (EM) Telemetry. In some downhole drilling operations there may be more than one telemetry system used to provide a backup system in case one of the wellbore telemetry systems fails or is otherwise unable to function properly.

The sensors used in the MWD tools are usually located in an electronics probe or instrumentation assembly contained in a cylindrical cover or housing, located near the drill bit. The surface retrievable probe housing is subject to harsh downhole environments with increased temperature and pressure, excessive shock and vibration, as well as fluid harmonics which are created as drilling fluid passes by the probe. The electronics and sensors of the MWD tool can therefore be easily damaged.

Currently in industry, deployment downhole of the MWD tools requires considerable manual manipulation of the control systems for the downhole tool. One of the last steps prior to setting the tool into the drill collar is the downloading of the tool's instruction commands or configuration files for operation of the MWD tool. This is typically accomplished by opening up the probe housing and providing an electrical communication connection between the probe electrical components and a surface computer system through some sort of CANbus/USB connection. Once the information has been transferred to the surface computer, the probe housing is re-secured and the tool is placed in the collar. There is an element of human error that can occur in this last step, such as not properly sealing the probe, which can cause failure of the tool. Furthermore, safety concerns due to improper handling of the tool can also be an issue with manipulation of the probe at location.

Bluetooth, standardized as IEEE 802.15.1, is a wireless technology standard for exchanging data over short distances from fixed and mobile devices, creating personal area networks with high levels of security. Primarily designed for low power consumption and low-bandwidth using radio (broadcast) systems, Bluetooth replaces cable connections while maintaining high levels of security. Bluetooth provides a secure way to connect and exchange information between devices such as mobile phones, laptops, personal computers, Global Positioning System (GPS) receivers, digital cameras and other devices. Bluetooth technology operates in the unlicensed industrial, scientific and medical (ISM) band at 2.4 to 2.485 GHz, using a spread spectrum, frequency hopping, full-duplex signal at a nominal rate of 1600 hops/sec. Each channel has a bandwidth of 1 MHz. The useful range may vary depending on radio class used in the implementation. The range of Bluetooth technology is application specific. The Core Specification mandates a minimum range of 10 meters, but there is no set limit and manufacturers can tune their implementations to provide the range needed to support the use cases for their solutions. On a drill rig location, range could be from approximately one meter (class 3 radio) to industrial class 1 radios of 100 meters.

SUMMARY

According to one aspect there is provided a downhole probe assembly comprising: one or more than one sensor for sensing downhole conditions; a controller in electrical communication with the one or more than one sensor and configured to receive and process information from the one or more than one sensor; a housing enclosing the one or more than one sensor and the controller; a Bluetooth device in electrical communication with the controller and configured to wirelessly transmit and receive electrical information respectively to and from a surface electronic interface; and an end cap assembly fitted at one end of the housing. The end cap assembly partially surrounds the Bluetooth device and is configured for transmission of the electrical information therethrough.

The downhole probe assembly may further comprise a transmission module in electrical communication with the controller. The transmission module may comprise an electrical connector and a portion of the Bluetooth device may mate with the electrical connector and electrically connect the transmission module and the Bluetooth device. The end cap assembly may comprise an end cap comprising a body and an end cap mating section. The end cap mating section may be configured to mate with a mating section of the transmission module to form a chamber between the transmission module and the end cap. The Bluetooth device may be positioned in the chamber. One or more than one o-ring may be positioned between the end cap mating section and the mating section of the transmission module to fluidly seal the chamber. The end cap mating section may comprise a female mating section with a cavity therein configured to matingly receive the mating section of the transmission module. A thickness of a wall of the female mating section surrounding the chamber may be reduced compared to a thickness of the wall surrounding the mating section of the transmission module.

The body of the end cap may comprise metal with a non-metal rod extending longitudinally therethrough. Alternatively, the end cap may include a transmission port comprising a longitudinally extending metal body surrounded by non-metal walls, one end of the metal body being electrically connected to a transceiver on the Bluetooth device and an opposite end of the metal body being on an external surface of the end cap, such that the metal body operates as an antenna for wirelessly receiving and transmitting the electrical information to and from the Bluetooth device.

The end cap assembly may further comprise a landing spider for positioning the downhole probe assembly within a drill collar and a connector connecting the landing spider to the end cap. The landing spider may comprise a plurality of apertures for flowing drilling fluid therethrough when the downhole probe assembly is positioned downhole. At least a portion of the connector may comprise non-metal material for transmission of the electronic information therethrough. The connector may releasably connect the landing spider to the end cap.

The downhole probe assembly may further comprise a switch configured to turn the Bluetooth device on and off in response to measured parameters of conditions downhole. The downhole probe assembly may further comprise a temperature sensor in electrical communication with the switch and the switch may be configured to turn the Bluetooth device off when the temperature is above a predetermined temperature and to turn the Bluetooth device on when the temperature is below the predetermined temperature. Alternatively, or additionally, the downhole probe assembly may further comprise a pressure sensor in electrical communication with the switch and the switch may be configured to turn the Bluetooth device off when the pressure is above a predetermined pressure and to turn the Bluetooth device on when the pressure is below the predetermined pressure.

According to another aspect, there is provided an end cap assembly for fitting to one end of a downhole probe assembly comprising one or more than one sensor for sensing downhole conditions; a controller in electrical communication with the one or more than one sensor; a transmission module in electrical communication with the controller; and a Bluetooth device mated with and electrically connected to the transmission module and configured to wirelessly transmit and receive electrical information respectively to and from a surface electronic interface. The end cap assembly comprises an end cap comprising a body and an end cap mating section configured to mate with a mating section of the transmission module to form a chamber enclosing the Bluetooth device between the transmission module and the end cap.

The end cap mating section may comprise a female mating section with a cavity therein configured to matingly receive the mating section of the transmission module. A thickness of a wall of the female mating section surrounding the chamber may be reduced compared to a thickness of the wall surrounding the mating section of the transmission module.

The body of the end cap may comprise metal with a non-metal rod extending longitudinally therethrough. Alternatively, the end cap may include a transmission port comprising a longitudinally extending metal body surrounded by non-metal walls, one end of the metal body being electrically connected to a transceiver on the Bluetooth device and an opposite end of the metal body being on an external surface of the end cap, such that the metal body operates as an antenna for wirelessly receiving and transmitting the electrical information to and from the Bluetooth device.

The end cap assembly may further comprise a landing spider for positioning the downhole probe assembly within a drill collar and a connector connecting the landing spider to the end cap. The landing spider may comprise a plurality of apertures for flowing drilling fluid therethrough when the downhole probe assembly is positioned downhole. At least a portion of the connector may comprise non-metal material for transmission of the electronic information therethrough. The connector may releasably connect the landing spider to the end cap.

DETAILED DESCRIPTION

The embodiments described herein generally relate to a downhole probe assembly incorporating a Bluetooth device for wirelessly transmitting electrical information between the downhole probe assembly and a surface electronic interface such as a computer. Though the disclosed embodiments have application for a Measurement While Drilling (MWD) tool, the Bluetooth device could also be used in any downhole probe assembly or tool used to sense conditions downhole.

Apparatus Overview

Figure 1:
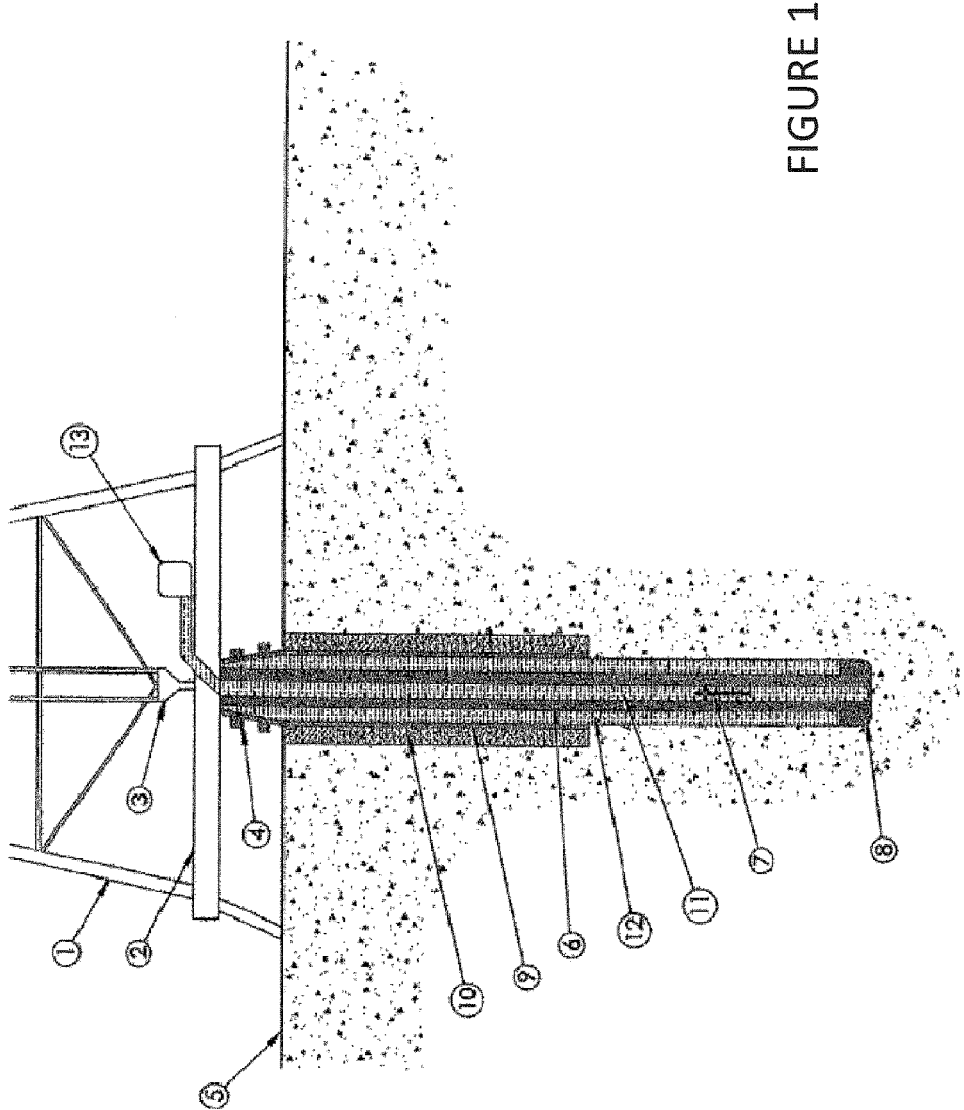
FIG. 1 is a schematic of a drill string in an oil and gas borehole including a downhole probe assembly in accordance with embodiments of the invention.

Referring to the drawings and specifically to FIG. 1, there is shown a schematic representation of a downhole probe assembly 7 used in downhole drilling equipment in accordance with embodiments of the invention. Downhole drilling equipment includes a derrick 1 with a rig floor 2 and draw works 3 to facilitate rotation of drill pipe 6 in the ground 5. The drill pipe 6 is enclosed in casing 9 which is fixed in position by casing cement 10. Bore drilling fluid 11 is pumped down drill pipe 6 by pump 13 and passes through the downhole probe assembly 7 before reaching a drill bit 8 at the end of the drill string. Annular drilling fluid 12 is then pumped back to the surface and passes through a blow out preventer (BOP) 4 positioned above the ground surface. The downhole probe assembly 7 may be a MWD tool 20 as shown in FIG. 2, however in alternative embodiments, the downhole probe assembly 7 may be any downhole probe that utilizes sensors.

Figure 2:
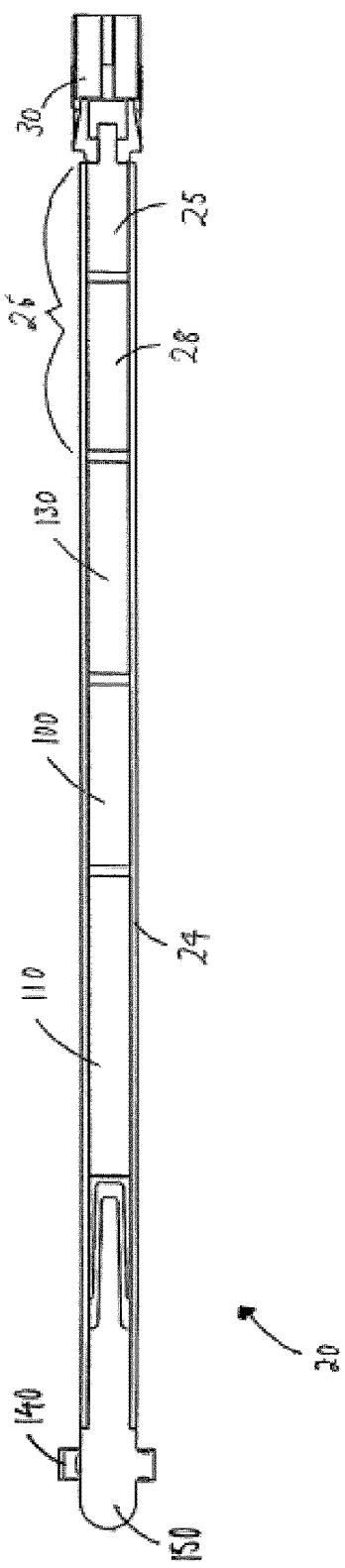
FIG. 2 is a longitudinally sectioned schematic view of a MWD tool of the downhole probe assembly, therein the MWD tool includes an end cap assembly and electronics subassembly in accordance with embodiments of the invention.

Referring to FIG. 2, there is shown a schematic representation of a MWD tool 20 in accordance with embodiments of the invention. In the embodiment shown, the MWD tool 20 is used for mud pulse telemetry whereby a fluid pressure pulse is generated, however MWD tools may be configured for other telemetry methods, for example but not limited to an electromagnetic telemetry MWD tool.

The MWD tool 20 generally comprises a housing 24 with an end cap assembly 150 fitted at one end of the housing 24. At the other end of the housing 24 is a fluid pulse generator 30. The end cap assembly 150 includes landing spider 140 for positioning the tool within a drill collar of a drill string. The housing 24 encloses a D&I sensor module 100 and a drilling conditions sensor module 130 longitudinally displaced and in electrical communication with a battery stack 110 and a pulser assembly 26. The pulser assembly 26 comprises an electronics subassembly 28 in electrical communication with a motor subassembly 25. The motor subassembly 25 drives the fluid pulse generator 30 to generate fluid pressure pulses which are transmitted to the surface and decoded. The fluid pulse generator 30 may comprise a rotor/stator combination as is known in the art. As would be apparent to a person of skill in the art, the arrangement of the modules and parts of the MWD tool 20 may differ to the arrangement of the modules and parts shown in the embodiment of FIG. 2 which is provided as an exemplary embodiment.

Electronics Subassembly

Figure 3:
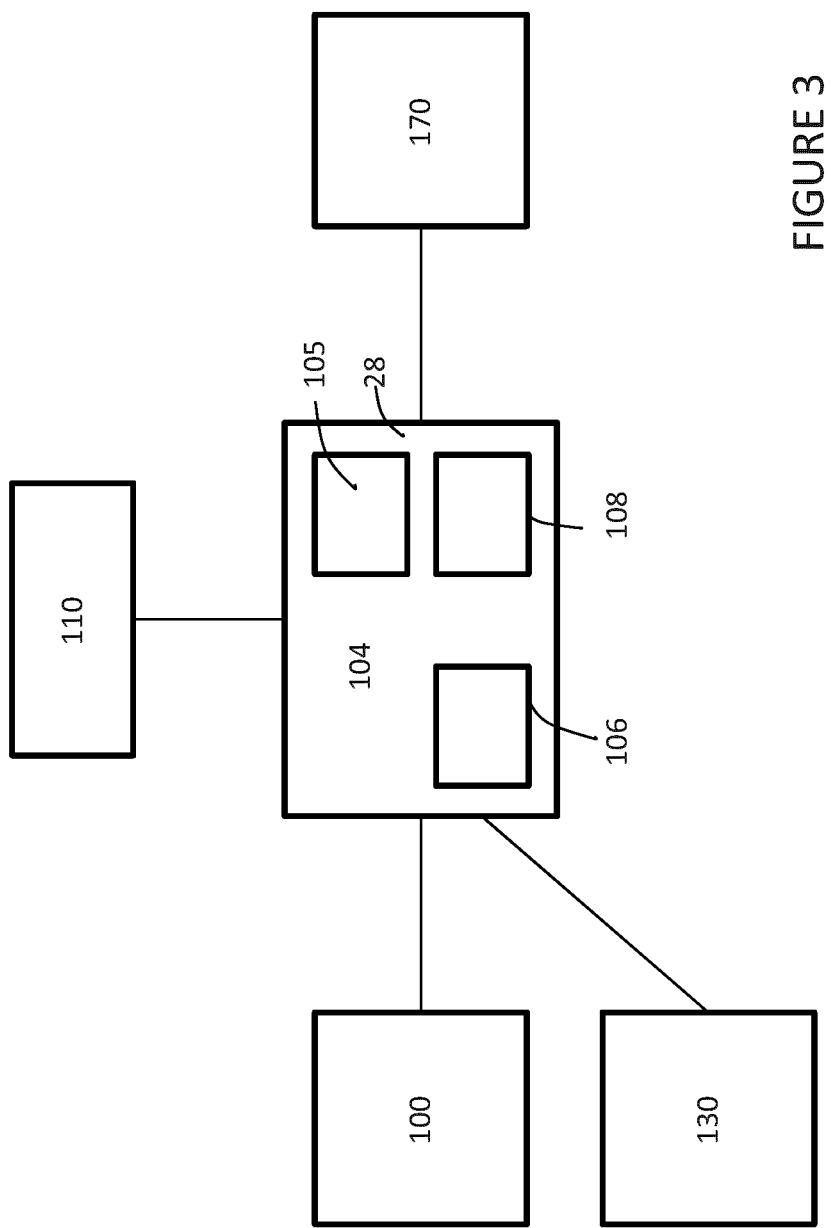
FIG. 3 is a schematic block diagram of components of the electronics subassembly and electrical interactions of the electronic subassembly with a Bluetooth device and other components of the MWD tool.

Referring now to FIG. 3, the electronics subassembly 28 comprises a main circuit board 104 comprising a printed circuit board with electronic components soldered on the surface of the board. The main circuit board 104 contains a data encoder 105, a central processing unit (controller) 106 and a memory 108 having stored thereon program code executable by the controller 106 using power from the battery stack 110. The main circuit board 104 receives information regarding direction and inclination of the drill string from the D&I sensor module 100, as well as measurements of drilling conditions from the drilling conditions sensor module 130. The D&I sensor module 100 and the drilling conditions sensor module 130 are each electrically communicative with the main circuit board 104 and send measurement data to the controller 106. The data encoder 105 encodes the information received by the controller 106 into telemetry data. The controller 106 then sends control signals to the motor subassembly 25 to generate pressure pulses using the pulse generator 30 corresponding to the telemetry data. In alternative embodiments, the controller 106 may send control signals for transmission of alternative telemetry data, such as EM telemetry data. Measurement data collected from the D&I sensor module 100 and the drilling conditions sensor module 130 may be stored in memory 108. A Bluetooth device 170 is also electrically communicative with the main circuit board 104 such that measurement data stored in the memory 108 can be wirelessly transmitted to a computer or other electronic interface via the Bluetooth device 170 once the MWD tool 20 is brought up to the surface as described in more detail below. Electrical command signals for operation of the MWD tool 20 can also be transmitted wirelessly from the surface computer to the Bluetooth device 170 and electrically communicated to the main circuit board 104 before the MWD tool 20 is positioned downhole.

D&I Sensor Module

The D&I sensor module 100 includes D&I sensors comprising accelerometers to measure inclination and magnetometers to measure azimuth, as well as associated data acquisition and processing circuitry. For both the accelerometers and the magnetometers, readings are taken which relate to each of the three orthogonal axes X, Y and Z, and these readings are sent to the controller 106 which uses calibration tables to factor in, for example, temperature drift, to provide X, Y and Z readings. The X, Y and Z readings indicate the direction and inclination of the probe and this information is sent to the surface as telemetry data. The accelerometers and magnetometers are industry standard sensors which are known in the art and are therefore not described in further detail.

Drilling Conditions Sensor Module

The drilling conditions sensor module 130 include sensors mounted on a circuit board, or communicative with a circuit board for taking various measurements of borehole parameters and conditions such as temperature, pressure, directional parameters, and gamma radiation. Such sensor modules 130 are well known in the art and thus are not described in detail here. One or more drilling conditions sensors modules 130 may be dispersed throughout the MWD tool 20 as necessary depending on the sensor type, function, and designer choice.

End Cap Assembly, Transmission Module and Bluetooth Device

Figure 5:
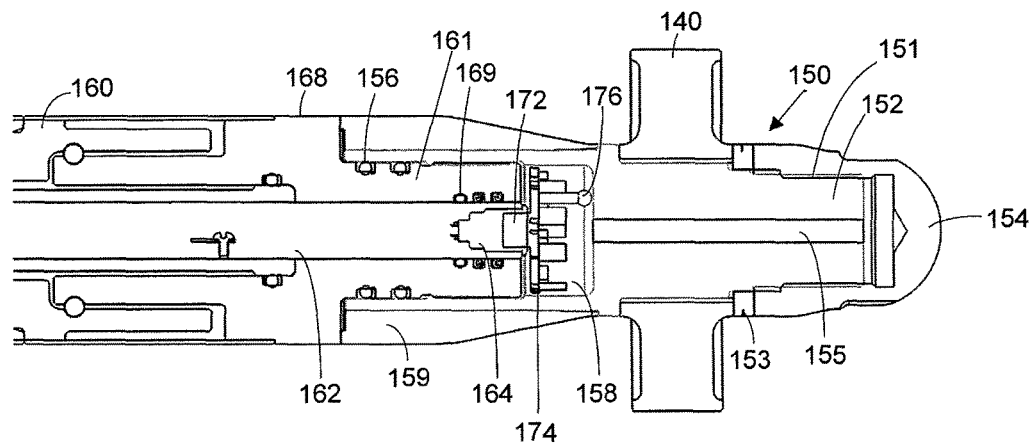
FIG. 5 is a longitudinally sectioned side view of one end of the MWD tool including the end cap assembly and Bluetooth device in accordance with another embodiment of the invention.
Figure 6:
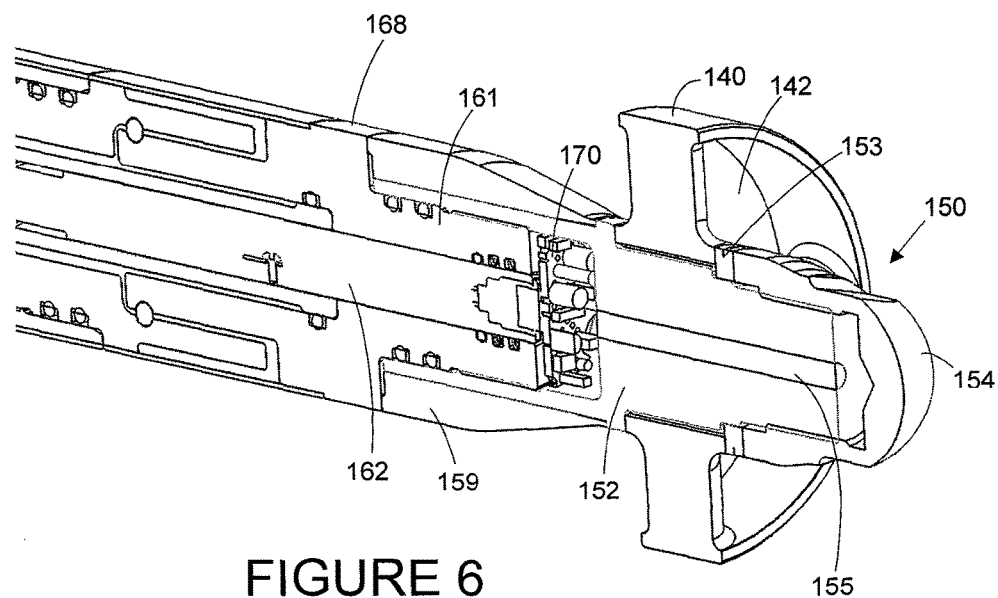
FIG. 6 is a longitudinally sectioned perspective view of the tool end of FIG. 5.
Figure 7:
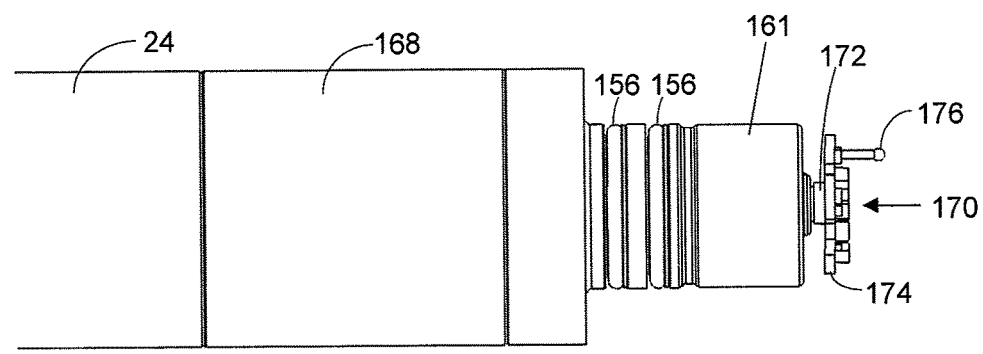
FIG. 7 is a side view of one end of the MWD tool ("tool end") including the Bluetooth device, without the end cap assembly.
Figure 8:
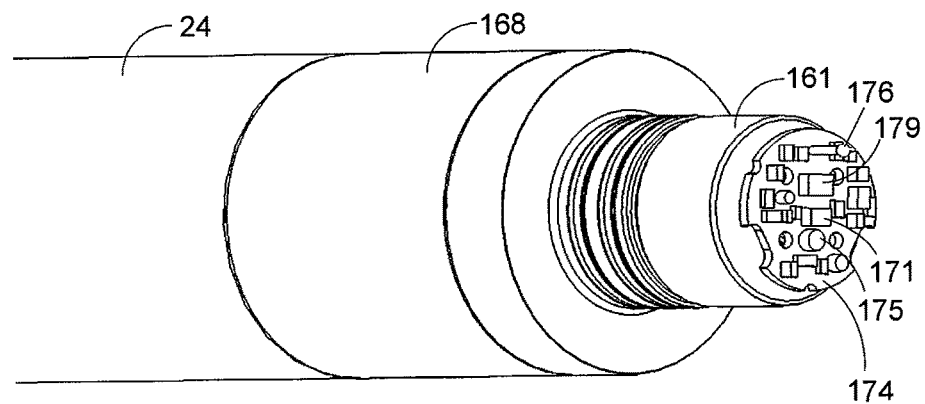
FIG. 8 is a perspective view of the tool end of FIG. 7.

Referring now to FIGS. 4 to 12, end cap assembly 150 is connected to a transmission module 160 at one end of the MWD tool 20. End cap assembly 150 comprises an end cap 151, landing spider 140 and acorn nut 154. The transmission module 160 includes a gap joint 168 which extends between the tool housing 24 and the end cap 151 when the end cap 151 is connected to the transmission module 160. As shown in FIGS. 7 and 8, the outer surface of the gap joint 168 is flush with the outer surface of the tool housing 24. When the end cap assembly 150 is connected to one end of the transmission module 160, as shown in FIGS. 4 to 6, 11 and 12, the outer surface of the end cap 151 is also flush with the outer surface of the gap joint 168.

The landing spider 140 is fixed into position on the end cap 151 by acorn nut 154 or some other connector as would be known in the art. The landing spider 140 has a number of apertures 142 and acts to correctly position the MWD tool 20 within the drill collar (not shown) whilst allowing drilling fluid (mud) to flow through the apertures 142 and between the outer surface of the housing 24 and the inner surface of the drill collar when the MWD tool 20 is positioned downhole. In one embodiment, the acorn nut 154 or other connector is releasably connected to end cap 151, such that acorn nut 154 or other connector can be removed for repair or replacement of landing spider 140 which is prone to damage from debris in drilling fluid flowing through the apertures 142. In an alternative embodiment, the acorn nut 154 or other connector may be fixedly connected to the end cap 151.

Figure 4:
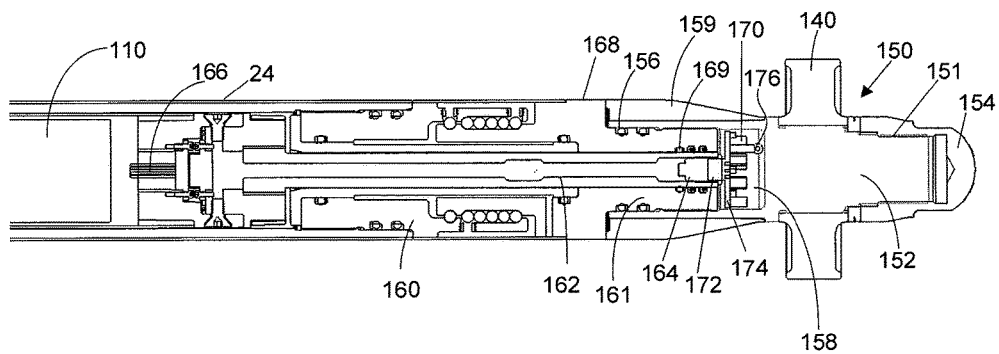
FIG. 4 is a longitudinally sectioned side view of one end of the MWD tool including the end cap assembly and Bluetooth device in accordance with one embodiment of the invention.
Figure 9:
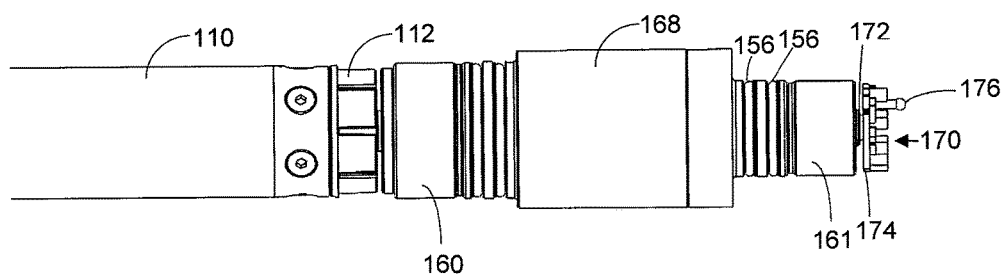
FIG. 9 is a side view of one end of the MWD tool ("tool end") including the Bluetooth device, without the end cap assembly and tool housing.

A transmission coupling 112 connects the battery stack 110 to the transmission module 160 as shown in FIG. 9. Extending through transmission module 160 is a transmission rod 162 which houses electrical wires, such as CANbus wires. At one end of the transmission rod 162 is an electrical connector 164, and at the other end of the transmission rod CANbus wires 166 electrically couple the transmission rod 162 to the battery stack 110 as shown in FIG. 4. The electrical connector 164 is therefore electrically communicative with the battery stack 110 and the main circuit board 104 of the tool. In use, operational commands are provided to the main circuit board 104 before the MWD tool 20 is positioned downhole. These commands include configuration files which relate primarily to operation of the MWD telemetry system, any changes to the firmware of the CPU, commands for testing the tool such as calibration checks and proper operation. In addition, measurement data and other operational data stored on the main circuit board 104 needs to be collected when the tool is brought up to the surface for review and logging, so as to allow monitoring of tool performance, battery consumption, integrity of pressure compensation housing and the like.

In known MWD tools, transmission of operational commands and other electrical information to and from a surface computer is carried out via a wired electrical connection provided by a CANbus/USB serial adaptor. The tool end is removed to expose the electrical connector 164 and the CANbus/USB serial adaptor mated with the electrical connector 164 as is known in the art. Transmission of data to and from known MWD tools therefore relies on human intervention in order to expose and connect the electrical connector 164 with the CANbus/USB serial adaptor. Human error can occur, such as not properly replacing and sealing the end of the tool, which can cause failure of the tool when it goes downhole. Furthermore, the step of removing and replacing the tool end typically needs to be carried out by skilled personnel using specialized tools which adds to the lag time before the tool can be positioned downhole. There is also a risk of electrical shock and tool damage if the re-assembly is not preformed properly. Human manipulation of the tool outside of the laboratory setting could also lead to increased risks with quality control.

In the embodiments described herein with reference to FIGS. 4 to 12, the Bluetooth device 170 is used to wirelessly transmit electrical information to and from a surface computer or other electronic interface. As is known in the art, Bluetooth is a wireless technology standard for exchanging data using short-wavelength UHF radio waves in the ISM band from 2.4 to 2.485 GHz. The electrical communication is bi-directional and the Bluetooth device 170 has its own unique ID which recognizes a specific frequency for transmitting and receiving electrical information. Power is provided to the Bluetooth device from the battery stack 110. The Bluetooth device 170 includes a CANbus/USB connector 172 which mates with (plugs into) electrical connector 164 to establish an electrical connection between the transmission rod 162 and the Bluetooth device 170. The CANbus/USB connector 172 is attached to one side of a circuit board 174 and an antenna 176 and other components of the Bluetooth device 170 are attached to the other side of the circuit board 174. The other components of the Bluetooth device mounted on the circuit board 174 may include a DC/DC power regulator 175 to reduce the voltage supplied by the battery stack 110, a microprocessor 171 for processing electronic information received from the CANbus/USB connector 172 and a transceiver 179 in electrical communication with the microprocessor 171 and the antenna 176 for wirelessly transmitting and receiving the electrical information via the antenna 176. The Bluetooth device 170 may be a standard Bluetooth device which can be plugged into the electrical connector 164 of a standard MWD tool. The Bluetooth device used should be able to withstand high temperatures which are encountered downhole, for example, a Bluetooth device with a temperature specification of 150° C. may be utilized.

The end cap assembly 150 is configured and adapted for connecting to a MWD tool which has the Bluetooth device 170 plugged into the electrical connector 164 as shown in FIGS. 7 to 9. In the embodiments shown in FIGS. 4 to 6, 11 and 12, the end cap 151 comprises a body section 152 and a female mating section 159 having a cavity therein for receiving and mating with a male mating section 161 of the transmission module to form a chamber 158 which fully encloses and protects the Bluetooth device 170. The transmission rod 162 passes through the male mating section 161 and connects with the Bluetooth device 170 positioned in the chamber 158 via the electrical connector 164 as described above in more detail. A pair of o-rings 156 positioned between the female mating section 159 and the male mating section 161 fluidly seal the chamber 158 to prevent drilling fluid entering and damaging the Bluetooth device 170. An o-ring 169 is also positioned between the outer wall of transmission rod 162 and the inner wall of housing of the male mating section 161. The pressure in the chamber 158 is typically atmospheric pressure. In alternative embodiments a different arrangement may be utilized for connecting the end cap 151 to the transmission module 160 for example, the transmission module may include a female mating section surrounding the Bluetooth device 170 which receives a male mating section of the end cap to form chamber 158. The end cap 151 may be releasably or fixedly connected to the transmission module 160 by a snap fit connection, threaded connection or other connection as would be known to a person of skill in the art.

In the embodiments shown in FIGS. 4 to 6, 11 and 12, the wall of the end cap female mating section 159 is configured such that the thickness of the wall decreases in the vicinity of chamber 158. The wall is thicker at the point where the female mating section 159 connects with the male mating section 161 to provide a solid connection, however, a thinner wall in the vicinity of the Bluetooth antenna 176 may beneficially reduce signal attenuation and help maintain good signal strength. In particular, the thickness and the material of the end cap wall beside the chamber 158 is selected to minimize the attenuation of Bluetooth radio waves therethrough such that the Bluetooth signal strength at a selected distance outside the end cap meets a selected threshold. The end cap female mating section 159 is typically pressure rated to about 20,000 psi to withstand the downhole pressure environment. The end cap 151 is typically made of metal to provide structural strength to withstand the harsh environmental conditions downhole and to protect the Bluetooth device 170 and other components in the probe. In one embodiment (not shown), a transmission line extends between the Bluetooth transceiver 179 and the metal end cap body 152. In this embodiment, the metal end cap body 152 functions as the Bluetooth antenna for transmitting signals to the surface computer or other electronic interface.

In another embodiment, the end cap body 152 includes a longitudinally extending rod 155 as shown in FIGS. 5 and 6. The rod 155 is made from a non-metal material, such as, but not limited to polyether ether ketone (PEEK), which acts as a pathway for transmitting Bluetooth signals from the Bluetooth antenna 176 through the end cap body 152 to a surface computer or other electronic interface. The rod 155 may beneficially improve the signal strength and allow the computer or other electronic interface to be positioned further away from the tool whilst still picking up a strong signal. A portion or all of the acorn nut 154 or other connector fixing the landing spider 140 to the end cap 151 may be made of a non-metal material to reduce signal attenuation. A metal retaining or locking ring 153 may be provided to fix the landing spider 140 in place on the end cap 151.

Figure 11:
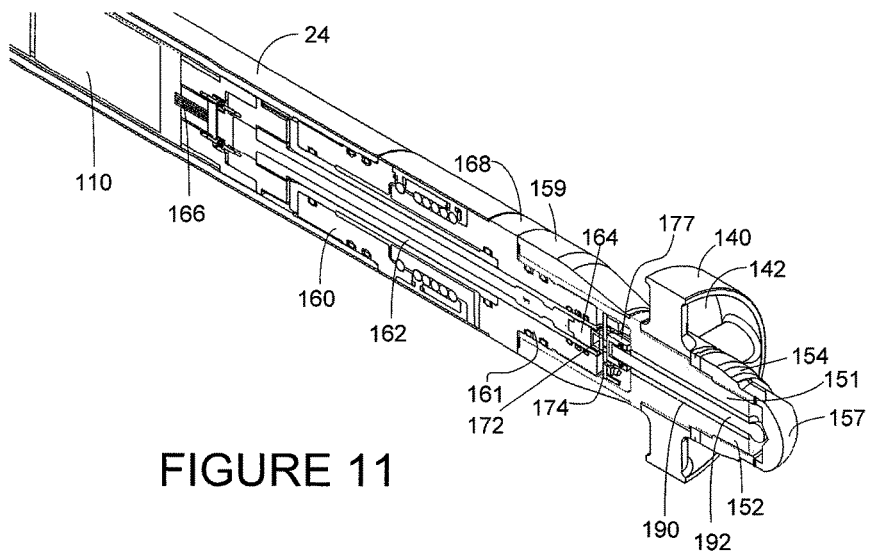
FIG. 11 is a longitudinally sectioned perspective view of the MWD tool including the end cap assembly and Bluetooth device in accordance with another embodiment of the invention.
Figure 12:
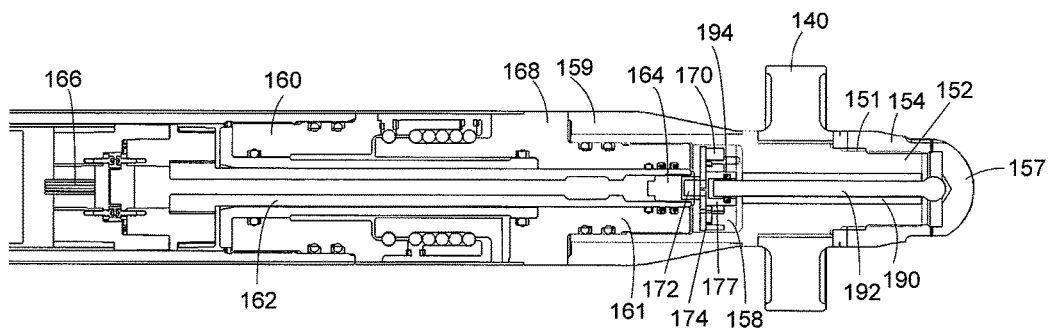
FIG. 12 is a longitudinally sectioned side view of an end of the MWD tool of FIG. 11.

In another embodiment, the end cap body 152 includes a feed through connector comprising a metal pin 192 surrounded by a non metal wall 190 as shown in FIGS. 11 and 12. The non-metal wall 190 extends longitudinally through the end cap body 152. A proximal end of the metal pin 192 extends into the chamber 158 and is directly connected to the Bluetooth device 170 by a connector 177 on the Bluetooth circuit board 174. A canted coil spring 194 electrically connects the metal pin 192 to the connector 177. The metal pin 192 acts as an antenna for transmitting signals between the Bluetooth device and a surface computer or other electronic interface. The metal pin 192 may be made of any metal that acts as an antenna for transmission of radio signals to and from the Bluetooth device, for example but not limited to beryllium copper. A pin like structure is not the only embodiment, and any metal body that longitudinally extends through the non-metal walls is encompassed. The non-metal walls may be made of any insulating material, such as, but not limited to polyether ether ketone (PEEK). In an alternative embodiment (not shown) a transmission line may electrically connect the Bluetooth transceiver 179 to the metal pin 192. The acorn nut or other connector 154 includes a cap 157 which surrounds the distal end of the metal pin 192. The cap 157 is made of a non-metal material such as plastic so that signals can pass from the distal end of the metal pin to the external environment. The remainder of the acorn nut or other connector 154 may be made of metal to provide a strong connection of the landing spider 140 to the end cap 151 and to protect the end cap from damage. In this embodiment, the Bluetooth antenna 176 need not be present as the metal pin 192 functions as an antenna for signal transmission. In an alternative embodiment (not shown) the feed through connector may be incorporated in the walls of the end cap mating section 159.

Figure 10:
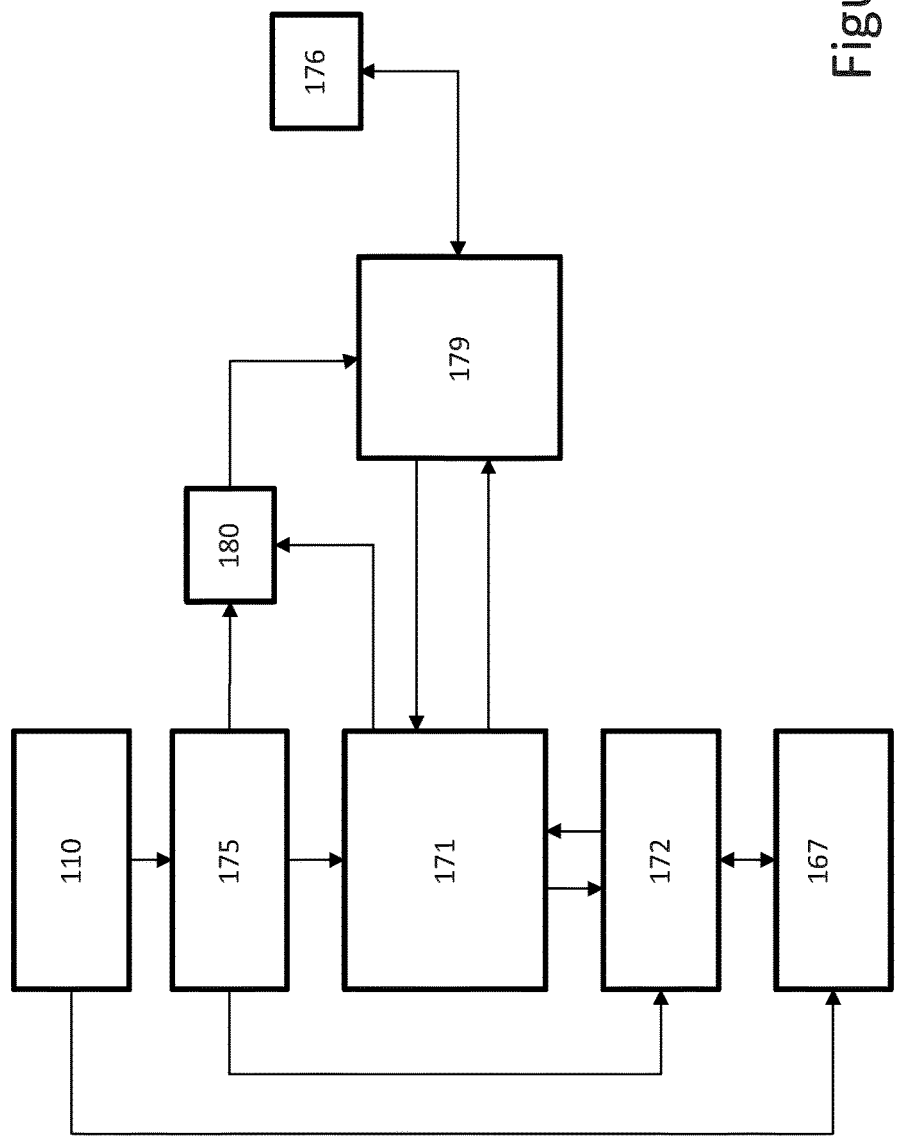
FIG. 10 is a schematic block diagram of components of the MWD tool including a switch to power on and off the Bluetooth device and electrical interactions of the switch with the Bluetooth device and other components of the MWD tool.

Referring now to FIG. 10, a switch 180 is provided to turn the Bluetooth device on or off. The switch 180 is positioned on the Bluetooth circuit board 174, however in alternative embodiments, the switch may be positioned on the main circuit board 104 or some other position within the tool. In use power is provided by the battery stack 110. The voltage is reduced by the DC/DC regulator 175 before passing to the Bluetooth microprocessor 171, switch 180, and Bluetooth CANbus/USB connector 172. When the switch 180 is turned on the Bluetooth transceiver 179 wirelessly sends out and receives signals to and from a surface computer or other electronic interface through Bluetooth antenna 176. In alternative embodiments, the end cap 151 or the metal pin 192 functions as the Bluetooth antenna in addition to, or alternatively to antenna 176 as described above in more detail. The transceiver 179 is electrically connected to the microprocessor 171 and the microprocessor 171 is electrically connected to the CANbus/USB connector 172. The microprocessor 171 processes electrical information received from the transceiver 179 and communicates this electrical information to the CANbus/USB connector 172. As the CANbus/USB connector 172 is electrically connected to the electrical connector 164 of the transmission module 160, this electrical information is communicated to the controller 106 on the main circuit board 104 of the tool and can be used for operation of the tool. In addition, electrical information from the main circuit board 104, such as measurements from sensors on the downhole probe assembly, is communicated to the microprocessor 171 via the CANbus/USB connector 172-electrical connector 164 interface for processing. The processed electrical information is then sent to the transceiver 179 and transmitted wirelessly to a surface computer via the antenna 176.

Bluetooth signals are typically too attenuated to be picked up by a surface computer when the probe is downhole, therefore the switch 180 is utilized to automatically switch off the Bluetooth device 170 when the probe is downhole to conserve power and to automatically switch the Bluetooth device 170 back on when the probe is brought back up to the surface so that electronic information can be transmitted to and from the surface computer or other electronic interface. The switch 180 is in electrical communication with the microprocessor 171 and is turned on and off in response to measured environmental parameters such as pressure and temperature. For example, a temperature sensor (not shown) may be positioned on the Bluetooth circuit board 174 or elsewhere within the tool. The temperature sensor is electrically communicative with the microprocessor 171. When the temperature rises above a predetermined temperature (generally indicative that the tool has gone downhole) the microprocessor 171 sends a signal to the switch 180 to turn off the transceiver 179 so that no signals are transmitted or received by the transceiver 179. When the temperature drops below the predetermined temperature (generally indicative that the tool is at or near the surface) the controller sends a signal to the switch 180 to turn the transceiver 179 back on and signals are transmitted and received via antenna 176. In addition, or alternatively, a pressure sensor may be included within the MWD tool 20 or on a separate probe. The pressure sensor directly or indirectly senses drilling fluid pressure in the downhole environment and is electrically communicative with the microprocessor 171. A signal is sent by the microprocessor 171 to the switch 180 to turn off the transceiver 179 if the pressure goes above a predetermined pressure indicating that the tool is downhole. A further signal is sent to the switch 180 to turn the transceiver 179 back on when the pressure falls below this predetermined pressure indicating that the tool is near or at the surface.

The Bluetooth device 170 allows electrical information to be transmitted to and collected from a surface computer or other electronic interface by wireless technology without the need to take the MWD tool out of the drill collar or to dismantle the MWD tool to expose the electrical connector 164. This may beneficially reduce lag time of the tool being on the surface, increase efficiency, reduce running costs as skilled personal are not needed to dismantle the tool, reduce safety risks arising from dismantling the tool, and reduce the likelihood that the tool will be damaged as a result of drilling mud leaking into the tool through improper sealing of the tool. The tool can also be re-programmed as necessary without needing to take the tool out of the drill collar. Manipulation of the tool can take place in a controlled laboratory environment by skilled personal before the tool is shipped to the site of use, thereby benefiting quality control and reducing the likelihood of damage of the tool. Any electronic interface which is configured to receive wireless information using Bluetooth technology, such as, but not limited to, a mobile phone or tablet, could be used for transmitting and receiving electrical data from the Bluetooth device 170 on the downhole probe assembly. Internet connectivity allows the information collected to be monitored offsite if required. As Bluetooth uses frequency-hopping spread spectrum, the Bluetooth device 170 can share a frequency band with many types of conventional transmissions found on a rig site with minimal interference.

The Bluetooth device 170 allows electrical information to be transmitted wirelessly without the need to dismantle the probe. The end cap 151 may therefore be fixedly connected to the transmission module 160. In alternative embodiments, the end cap 151 may be releasably connected to the transmission module to allow access to the Bluetooth device 170 for repair or replacement of the device if needed. A known MWD tool can be retrofitted with the Bluetooth device 170 and end cap subassembly 150 of the presently disclosed embodiments. The end cap subassembly 150 is configured and adapted to promote signal transmission between the Bluetooth device 170 and a surface computer or other electronic interface. There is no need to adapt any other part of the MWD tool in order for the tool to have Bluetooth signal transmission capability. The tool can therefore be easily and cheaply retrofitted for Bluetooth transmission.

The Bluetooth device 170 has its own unique ID, therefore a MWD tool or other downhole probe assembly in which the device is installed can be tracked by wireless communications systems and Global Positioning System (GPS) locators. An operator can therefore track the positioning of the tool if the tool is moved to a different location, misplaced or taken off site for servicing.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

The invention claimed is:

1. A downhole probe assembly comprising:
   one or more than one sensor for sensing downhole conditions;
   a controller in electrical communication with the one or more than one sensor and configured to receive and process information from the one or more than one sensor;
   a housing enclosing the one or more than one sensor and the controller;
   a Bluetooth device in electrical communication with the controller and configured to wirelessly transmit and receive electrical information respectively to and from a surface electronic interface; and
   an end cap assembly fitted at one end of the housing, the end cap assembly comprising an end cap comprising a metal body partially surrounding the Bluetooth device and a non-metal rod, wherein the metal body presents a channel extending longitudinally relative to the Bluetooth device, with the non-metal rod received in the channel to transmit the electrical information.

2. The downhole probe assembly of claim 1, further comprising a transmission module in electrical communication with the controller, the transmission module comprising an electrical connector, wherein a portion of the Bluetooth device mates with the electrical connector and electrically connects the transmission module and the Bluetooth device.

3. The downhole probe assembly of claim 2, wherein the end cap further comprises an end cap mating section configured to mate with a mating section of the transmission module to form a chamber between the transmission module and the end cap, the Bluetooth device being positioned in the chamber.

4. The downhole probe assembly of claim 3, wherein one or more than one o-ring is positioned between the end cap mating section and the mating section of the transmission module to fluidly seal the chamber.

5. The downhole probe assembly of claim 3, wherein the end cap mating section comprises a female mating section with a cavity therein and the mating section of the transmission module is a male mating section, wherein the female mating section is configured to matingly receive the male mating section of the transmission module.

6. The downhole probe assembly of claim 5, wherein a thickness of a wall of the female mating section surrounding the chamber is reduced compared to a thickness of the wall of the female mating section surrounding the male mating section of the transmission module.

7. The downhole probe assembly of claim 1, wherein the end cap assembly further comprises a landing spider for positioning the downhole probe assembly within a drill collar and a connector connecting the landing spider to the end cap, the landing spider comprising a plurality of apertures for flowing drilling fluid therethrough when the downhole probe assembly is positioned downhole, wherein at least a portion of the connector comprises non-metal material for transmission of the electronic information therethrough.

8. The downhole probe assembly of claim 7, wherein the connector releasably connects the landing spider to the end cap.

9. The downhole probe assembly of claim 1, further comprising a switch configured to turn the Bluetooth device on and off in response to measured parameters of conditions downhole.

10. The downhole probe assembly of claim 9, wherein the downhole probe assembly further comprises a temperature sensor in electrical communication with the switch and the switch is configured to turn the Bluetooth device off when the temperature is above a predetermined temperature and to turn the Bluetooth device on when the temperature is below the predetermined temperature.

11. The downhole probe assembly of claim 9, wherein the downhole probe assembly further comprises a pressure sensor in electrical communication with the switch and the switch is configured to turn the Bluetooth device off when the pressure is above a predetermined pressure and to turn the Bluetooth device on when the pressure is below the predetermined pressure.

12. A downhole probe assembly comprising:
(a) one or more than one sensor for sensing downhole conditions;
(b) a controller in electrical communication with the one or more than one sensor and configured to receive and process information from the one or more than one sensor;
(c) a housing enclosing the one or more than one sensor and the controller;
(d) a Bluetooth device in electrical communication with the controller and configured to wirelessly transmit and receive electrical information respectively to and from a surface electronic interface; and (e) an end cap assembly fitted at one end of the housing, the end cap assembly comprising an end cap comprising a metal body and a feed through connector longitudinally extending through the metal body, the feed through connector comprising a longitudinally extending metal rod surrounded by non-metal walls, wherein one end of the metal rod is electrically connected to a transceiver on the Bluetooth device, such that the metal rod operates as an antenna for wirelessly receiving and transmitting the electrical information to and from the Bluetooth device.

13. An end cap assembly for fitting to one end of a downhole probe assembly comprising one or more than one sensor for sensing downhole conditions; a controller in electrical communication with the one or more than one sensor; and a Bluetooth device in electrical communication with the controller and configured to wirelessly transmit and receive electrical information respectively to and from a surface electronic interface, the end cap assembly comprising an end cap comprising a metal body partially surrounding the Bluetooth device and a non-metal rod, wherein the metal body presents a channel extending longitudinally relative to the Bluetooth device, with the non-metal rod received in the channel to transmit the electrical information.

14. The end cap assembly of claim 13, wherein the end cap assembly further comprises an end cap mating section, the end cap mating section configured to mate with a mating section of a transmission module in electrical communication with the controller to form a chamber enclosing the Bluetooth device between the transmission module and the end cap.

15. The end cap assembly of claim 14, wherein the end cap mating section comprises a female mating section with a cavity therein and the mating section of the transmission module is a male mating section, wherein the female mating section is configured to matingly receive the male mating section of the transmission module.

16. The end cap assembly of claim 15, wherein a thickness of a wall of the female mating section surrounding the chamber is reduced compared to a thickness of the wall of the female mating section surrounding the male mating section of the transmission module.

17. The end cap assembly of claim 13, wherein the end cap assembly further comprises a landing spider for positioning the downhole probe assembly within a drill collar, and a connector connecting the landing spider to the end cap, the landing spider comprising a plurality of apertures for flowing drilling fluid therethrough when the downhole probe assembly is positioned downhole, wherein at least a portion of the connector comprises non-metal material for transmission of the electronic information therethrough.

18. The end cap assembly of claim 17, wherein the connector releasably connects the landing spider to the end cap.

19. An end cap assembly for fitting to one end of a downhole probe assembly comprising one or more than one sensor for sensing downhole conditions; a controller in electrical communication with the one or more than one sensor; and a Bluetooth device in electrical communication with the controller and configured to wirelessly transmit and receive electrical information respectively to and from a surface electronic interface, the end cap assembly comprising an end cap comprising a metal body and a feed through connector longitudinally extending through the metal body, the feed through connector comprising a longitudinally extending metal rod surrounded by non-metal walls, wherein one end of the metal rod is electrically connected to a transceiver on the Bluetooth device, such that the metal rod operates as an antenna for wirelessly receiving and transmitting the electrical information to and from the Bluetooth device.

* * * * *